(12) United States Patent
Drexlmaier

(10) Patent No.: US 7,545,067 B2
(45) Date of Patent: Jun. 9, 2009

(54) PERMANENT MAGNET ROTOR FOR A BRUSHLESS ELECTRICAL MACHINE

(75) Inventor: Thomas Drexlmaier, Würzburg (DE)

(73) Assignee: Siemens Aktiengesellschaft, Munich (DE)

( * ) Notice: Subject to any disclaimer, the term of this patent is extended or adjusted under 35 U.S.C. 154(b) by 357 days.

(21) Appl. No.: 11/459,432

(22) Filed: Jul. 24, 2006

(65) Prior Publication Data
US 2007/0024141 A1    Feb. 1, 2007

(30) Foreign Application Priority Data
Jul. 29, 2005    (EP)    ................... 05016577

(51) Int. Cl.
H02K 1/30    (2006.01)
H02K 1/28    (2006.01)

(52) U.S. Cl. .................... 310/156.13; 310/156.12; 310/156.08; 310/156.19; 310/156.22

(58) Field of Classification Search ............ 310/156.08, 310/156.12, 156.13, 156.26, 156.28, 156.29, 310/156.19, 156.38, 156.41, 156.53
See application file for complete search history.

(56) References Cited

U.S. PATENT DOCUMENTS

| 4,120,618 | A | * | 10/1978 | Klaus | 417/420 |
|---|---|---|---|---|---|
| 4,227,105 | A | * | 10/1980 | Kumakura | 310/153 |
| 5,831,364 | A | * | 11/1998 | Buse | 310/156.28 |
| 5,907,206 | A | * | 5/1999 | Shiga et al. | 310/156.05 |
| 5,998,902 | A | * | 12/1999 | Sleder et al. | 310/153 |
| 6,087,748 | A | | 7/2000 | Donner | 310/91 |
| 6,220,826 | B1 | | 4/2001 | Dobler et al. | 417/356 |
| 6,548,925 | B2 | * | 4/2003 | Noble et al. | 310/74 |
| 6,844,646 | B1 | * | 1/2005 | Werson et al. | 310/156.16 |
| 6,879,075 | B2 | * | 4/2005 | Calfo et al. | 310/156.01 |
| 6,911,756 | B1 | * | 6/2005 | Chang | 310/156.01 |
| 7,088,024 | B2 | * | 8/2006 | Agnes et al. | 310/154.12 |
| 7,166,942 | B2 | * | 1/2007 | Yokota | 310/54 |
| 2004/0189129 | A1 | | 9/2004 | Takahashi et al. | 310/156.19 |
| 2004/0189140 | A1 | | 9/2004 | Fukuda et al. | 310/261 |

FOREIGN PATENT DOCUMENTS

| DE | 19601271 | 1/1996 |
|---|---|---|
| DE | 19942029 | 9/1999 |
| DE | 19951594 | 10/1999 |
| DE | 20201831 | 4/2002 |
| EP | 0942511 | 3/1999 |
| FR | 2650713 | 2/1991 |
| GB | 2275134 | 8/1994 |
| JP | 3-285546 | * 12/1991 ................. 310/153 |
| WO | 0074209 | 12/2000 |

* cited by examiner

Primary Examiner—Burton Mullins
(74) Attorney, Agent, or Firm—King & Spalding L.L.P.

(57) ABSTRACT

A permanent magnet rotor for a brushless electrical machine has a rotor shaft and a cylindrical plastic cage. Permanent magnets are inserted in this plastic cage. The plastic cage has dovetailed retainers. The permanent magnets are trapezoidal in shape and are inserted so as to fit tightly in the dovetailed retainers.

19 Claims, 3 Drawing Sheets

PERMANENT MAGNET ROTOR FOR A BRUSHLESS ELECTRICAL MACHINE

PRIORITY

This application claims priority from European Patent Application No. EP05016577, which was filed on Jul. 29, 2005, and is incorporated herein by reference in its entirety.

TECHNICAL FIELD

The present invention relates to a permanent magnet rotor for a brushless electrical machine.

BACKGROUND

A magnet pole rotor having a multiplicity of magnet poles arranged on the exterior cylindrical face of a base ring of the rotor is known from DE 196 01 271 A1. The magnet poles are embedded in a plastic ring, which is an injection molded component. The plastic ring is pressed on to the exterior cylindrical face of the base ring. A cage ring that laps over the plastic ring is provided to protect against any displacement of the plastic ring on the exterior cylindrical face of the base ring.

DE 199 42 029 A1 discloses a permanent magnet rotor for a brushless electric motor in which the permanent magnet rotor has a cylindrical lamellar rotor body. The said cylindrical lamellar rotor body is fixedly connected to the rotor shaft and has segment-form permanent magnets arranged along the circumference of the cylinder. The said segment-form permanent magnets can be pressed and held against the circumference of the cylinder of the rotor body using a means of fixing. The means of fixing is a series of resilient retaining clamps.

GB 2 275 134 A discloses a permanent magnet rotor for an electric motor with a rotor base body having a cylindrical exterior face. Arranged on the exterior face of this rotor base body are a multiplicity of permanent magnets, it being the case that the permanent magnets are spaced apart from one another. A poured jacket of plastic material or resin that covers the exterior face of the permanent magnets and fills the gaps between the permanent magnets is also provided. The poured jacket, which is itself provided with permanent magnet material, serves to fix the permanent magnets to the rotor and to cause the changes in the magnetic flux between magnets that are adjacent in the circumferential direction to be only gradual.

WO 00/74209 A1 discloses a rotor for a brushless motor in which a shrinkable sleeve is provided to fix in place the magnet segments of the rotor. When this rotor is being assembled, the magnet segments are initially placed loosely in a cage. A rotor core can then be inserted axially into the radial interior region of the magnet segments, which are together arranged in the form of a ring. The magnet segments are fixed in place using the aforementioned shrinkable sleeve. The said shrinkable sleeve initially takes the form of a tube that is made from a material that shrinks when exposed to heat and is pushed over the magnet segments in the axial direction. When the required temperature, which advantageously lies in the range between 100° C. and 200° C., is applied to the said tube, the tube contracts to create a shrink-fitted sleeve that fixes the magnet segments to the rotor.

SUMMARY

The object of the present invention is to specify a permanent magnet rotor for a brushless electrical machine, which permanent magnet rotor can be manufactured quickly and easily and enables the distance between the rotor and the stator to be kept small when used in a brushless electrical machine.

This object can be achieved by a permanent magnet rotor for a brushless electrical machine, comprising a rotor shaft and a cylindrical plastic cage in which permanent magnets are inserted, wherein the plastic cage has dovetailed retainers and the permanent magnets are trapezoidal in shape and are inserted so as to fit tightly in the dovetailed retainers.

The plastic cage may have a web between each pair of adjacent permanent magnets and the permanent magnets may be clamped with no play by the webs and a return ring. The height dimension of the webs can be slightly larger than the height dimension of the permanent magnets. The width dimension of the webs in the region of the inner end area, as viewed in the radial direction, of the permanent magnets can be smaller than the width dimension of the webs in the region of the outer end area, as viewed in the radial direction, of the permanent magnets. The exterior faces of the webs and the exterior faces of the permanent magnets may meet flush with one another. The permanent magnets may have a rectangular exterior face. The exterior faces of the webs and the exterior faces of the permanent magnets may form a continuous exterior face of the permanent magnet rotor. The plastic cage may have two rings, spaced apart from each other in the axial direction, that are joined together by the webs and the inner diameter of the first ring may be smaller than the inner diameter of the second ring. The first ring may serve as a stopping surface for the return ring. The second ring may serve as a stopping surface for the permanent magnets. The rotor shaft may be provided with a step and this step may serve as a stopping surface for an axial end region of the plastic cage with magnets and return ring inserted. The other end region of the plastic cage with magnets and return ring inserted may be fixed to the rotor shaft using a coupling nut. The rotor shaft may be provided with a second step, the other end region of the plastic cage with magnets and return ring inserted may rest against a mounting plate and the mounting plate may be attached to the rotor shaft using fastening screws.

The particular advantages of the invention stem from the fact that the exact placement of the permanent magnets in the plastic cage ensures that the permanent magnets are precisely positioned on the rotor. The invention ensures in particular that the permanent magnets are spaced an equal distance apart from one another. A permanent magnet rotor according to the invention, moreover, can be assembled quickly and easily, which reduces cycle times in the factory. A permanent magnet rotor according to the invention additionally allows straightforward process monitoring in later operation, as it does not have to be destroyed for testing purposes. The dovetailed retainers of the plastic cage, furthermore, ensure that the permanent magnets are fixed to the rotor while the rotor is operating and cannot come loose from the latter. No other element need be arranged between the permanent magnets and the stator of the machine in order to achieve this fixing. As a consequence of this, the spacing between the exterior face of the rotor and the interior face of the stator in which the rotor is rotatably mounted can be small when a permanent magnet rotor according to the invention is used.

The plastic webs provided between adjacent permanent magnets advantageously fill the gap between adjacent permanent magnets with plastic. This avoids the creation of annoying running noises, such as can be generated by air separation, for example, when the rotating machine is in operation. The edges of the permanent magnets in the region of the outer surfaces are also protected against damage. The efficiency of the electric motor, moreover, is improved, because there are no metallic bridges between the permanent magnets and because, as already described, the spacing between the rotor and the stator can be made small.

If the plastic cage, according to an embodiment, consists of two rings, spaced apart from each other in the axial direction, that are joined together by the webs, only a small amount of plastic material is required for the plastic cage, which further reduces production costs. The first ring, in addition, advantageously serves as a stopping face for the return ring and the second ring advantageously serves as a stopping face for the permanent magnets. This further simplifies the assembly of the permanent magnet rotor.

BRIEF DESCRIPTION OF THE DRAWINGS

Further advantageous properties of the invention are revealed by the description of an exemplary embodiment presented with reference to the figures.

DETAILED DESCRIPTION

Figure 1A:
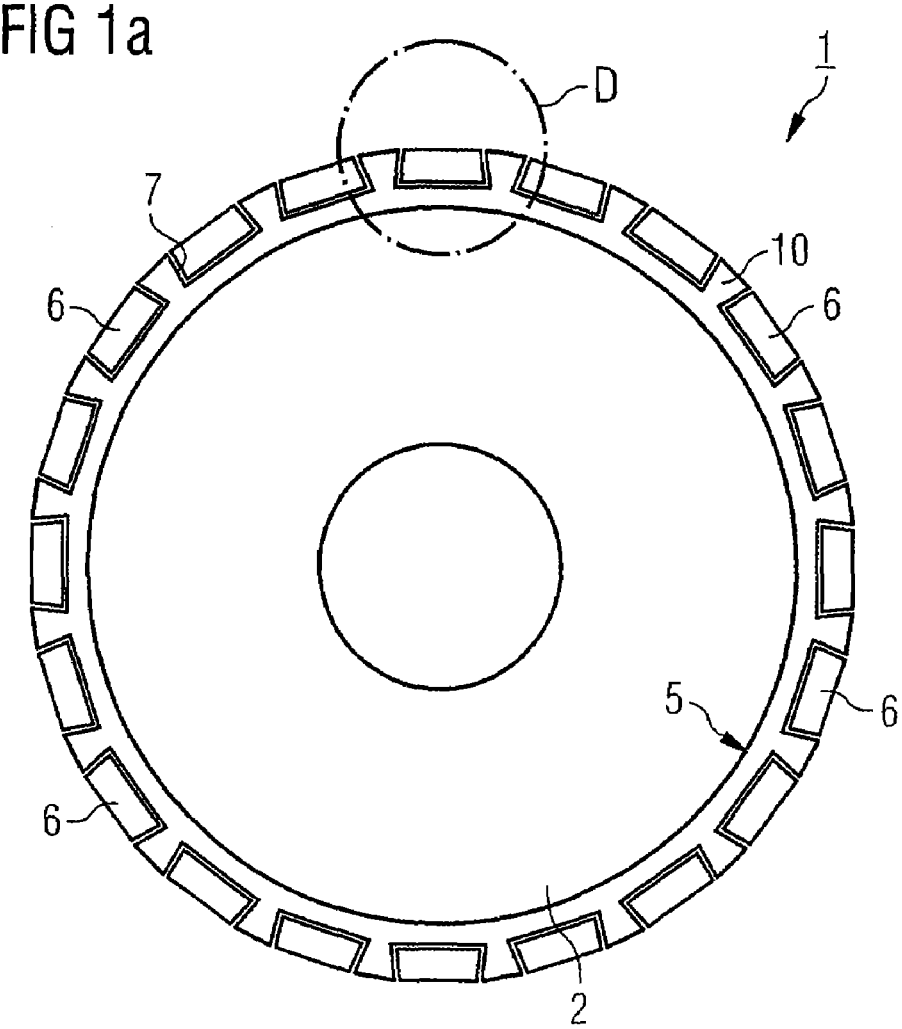
FIG. 1 shows a permanent magnet rotor according to the invention.

FIG. 1a shows a permanent magnet rotor according to the invention. The permanent magnet rotor 1 shown has a rotor shaft 2 realized as a hollow cylindrical rotor shaft. The rotor shaft 2 serves as the bearer for a plastic cage 5 into which are inserted, in the axial direction, a return ring 4 that is not visible in FIG. 1a and permanent magnets 6. The function of the said return ring 4 is to complete the magnetic circuit running through the permanent magnets 6. It also helps to ensure that the permanent magnets are pressed with no play between the plastic cage 5 and the return ring 4.

The plastic cage 5 contains a multiplicity of webs 10 protruding outward in the radial direction that together with other components of the plastic cage form dovetailed retainers for the permanent magnets 6.

Figure 1B:
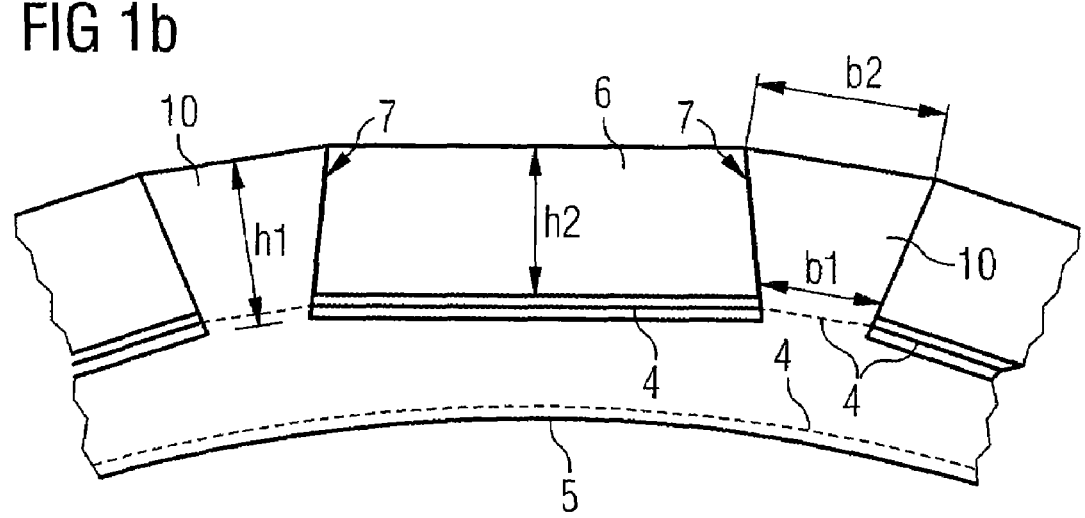

The detail D enclosed by the broken circle in FIG. 1a is shown enlarged in FIG. 1b. This enlarged view shows that the retainers 7 in the plastic cage 5 have a dovetail shape and that the permanent magnets 6 inserted into these retainers have a trapezoidal shape such that they fit tightly when positioned in the retainers.

The height dimension h1 of the plastic webs 10 is slightly larger than the height dimension h2 of the permanent magnets such that adjacent permanent magnets are separated from each another along the whole of their height by the plastic web arranged between them. The width dimension b1 of the plastic webs 10 in the region of the inner end area, as viewed in the radial direction, of the permanent magnets is smaller than the width dimension b2 of the plastic webs 10 in the region of the outer end area, as viewed in the radial direction, of the permanent magnets.

The permanent magnets 6, in their central region as viewed in the axial direction, rest directly against the return ring 4 shown in FIG. 1b, which return ring is positioned behind the annular front terminal face of the plastic cage 5 as viewed in the axial direction.

FIG. 1b also shows that the radial exterior faces of the webs 10 and the radial exterior faces of the permanent magnets 6 meet flush with one another. The radial exterior faces of the webs 10 and the radial exterior faces of the permanent magnets 6 together form a continuous exterior face of the permanent magnet rotor. The gaps between adjacent permanent magnets 6 are completely filled with the plastic material of the webs 10 provided between the permanent magnets. This advantageously prevents annoying running noises being created by the rotor in operation. The outer edges of the permanent magnets are in addition protected against damage in operation, as they do not protrude into the air gap between the stator and the rotor.

The dovetailed retainers of the plastic cage 5 and the trapezoidal design of the permanent magnets 6, furthermore, ensure that the permanent magnets fit tightly in the plastic cage. This makes sure that even when the rotor is rotating fast, the permanent magnets cannot come loose from the rotor, bridge the air gap between the rotor and stator and damage or even destroy the electrical machine.

Figure 2B:
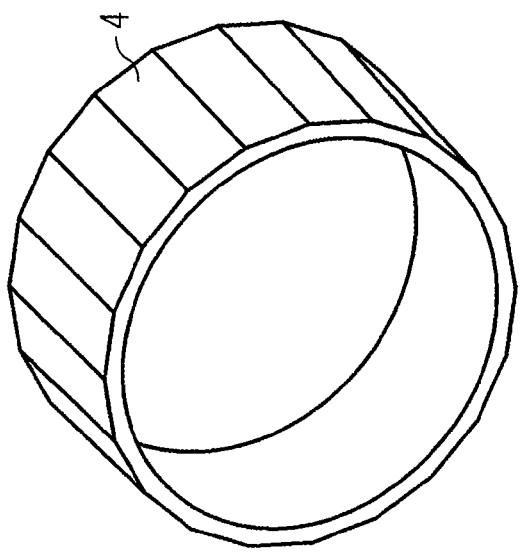
FIG. 2 shows components of the permanent magnet rotor in a perspective view.
Figure 2C:
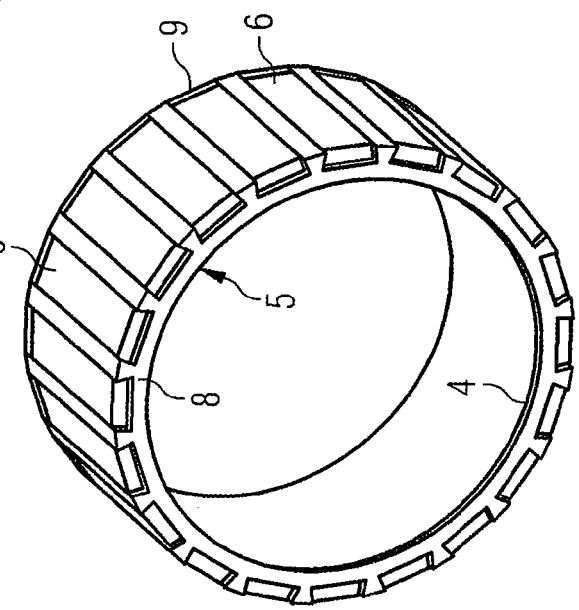
Figure 2A:
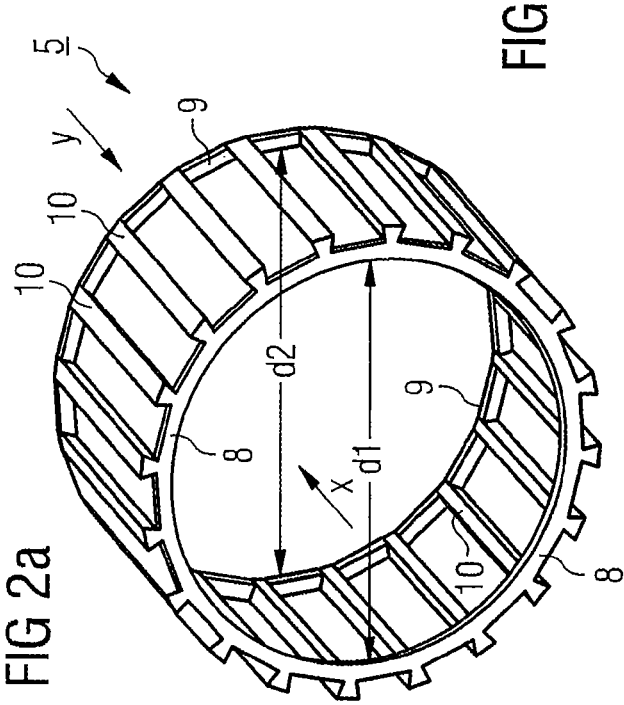

FIG. 2 shows components of the permanent magnet rotor shown in FIG. 1 in a perspective view. The plastic cage 5, which has a hollow cylindrical overall design and into which the permanent magnets and the return ring are inserted when the rotor is assembled, is shown in FIG. 2a. The plastic cage 5 has a first ring 8 and, spaced apart therefrom in the axial direction, a second ring 9. These two rings are connected to each other by the webs 10 that extend in the axial direction. The webs and the rings together form the dovetailed retainers for the permanent magnets. The diameter d1 of the first ring 8 is smaller than the diameter d2 of the second ring 9. The permanent magnets are inserted into the dovetailed retainers in the plastic cage 5 in the direction of the arrow x, the interior face of the ring 9 serving as a stopping surface for the permanent magnets.

FIG. 2b shows the return ring 4 in a perspective view. The exterior surface of the return ring consists of a series of flat-faced segments as viewed in the circumferential direction on account of the fact that the permanent magnets are preferably cuboidal such that the radial inner face and the radial outer face of the permanent magnets are in each case rectangular. The outer radius of the return ring 4 matches the inner radius of the ring 9 of the plastic cage 5, so the return ring 4 can be inserted into the plastic cage 5 in the direction of arrow y (FIG. 2a) with the permanent magnets 6 already in place so as to create a tight fit. The interior face of the ring 8 serves here as a stopping surface for the return ring 4. If the return ring 4 is inserted into the plastic cage 5, the permanent magnets rest directly against the return ring 4 and are clamped with no play between the plastic cage and the return ring.

FIG. 2c shows a perspective view of the plastic cage 5 with the permanent magnets 6 and the return ring 4 inserted.

There is no undesirable relative rotation in the circumferential direction between the return ring 4, the plastic cage 5 and the permanent magnets 6 inserted in the retainers of the plastic cage when the rotor is operating even under high loads.

The unit shown in FIG. 2c comprising the plastic cage 5, the permanent magnets 6 and the return ring 4 is pushed onto the rotor shaft 2 and fastened thereto.

Figure 3A:
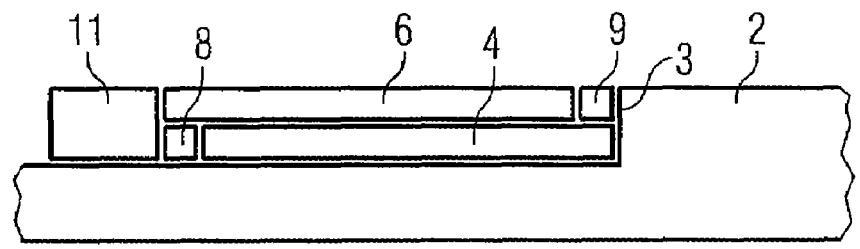
FIG. 3 shows longitudinal section views of a permanent magnet rotor according to the invention.
Figure 3A:
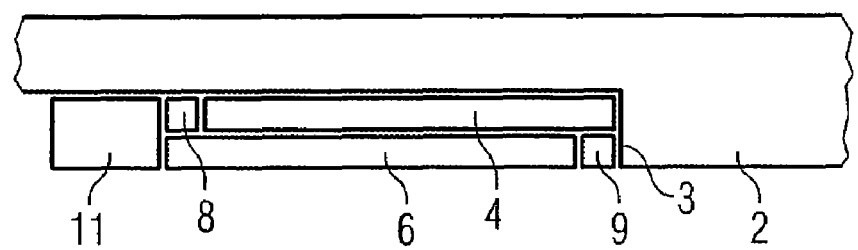

A first embodiment, which is shown in FIG. 3a, provides for this to be done as follows:

The rotor shaft 2 is realized as a hollow shaft that is provided with a step 3 on its exterior face. The unit shown in FIG. 2c is pushed onto the rotor shaft, the step 3 of the rotor shaft serving as an axial stopping surface for the said unit. It can be seen that the ring 9 and one of the axial stopping surfaces of the return ring 4 rest directly against the step 3. The ring 8 and a stopping surface of the permanent magnets 6 are fastened to the rotor shaft 2 using a coupling nut 11.

The permanent magnet rotor created by this means is quick and easy to produce and runs quietly and reliably when in operation. If a permanent magnet rotor of this type is arranged rotatably in a stator in a brushless electrical machine with just a small separation from the said stator, the machine will operate with a high level of efficiency.

Figure 3B:
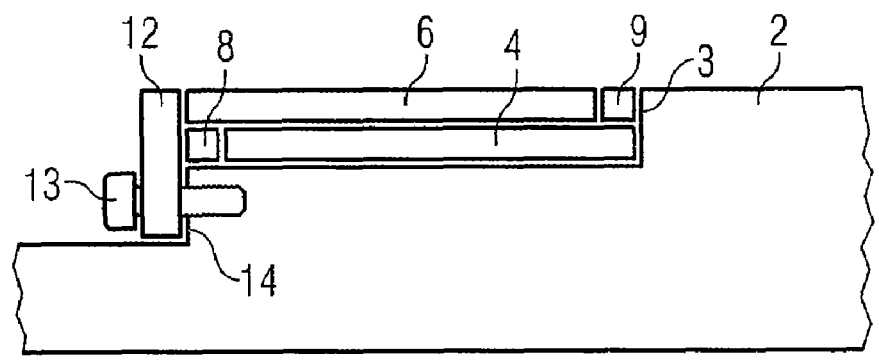
Figure 3B:
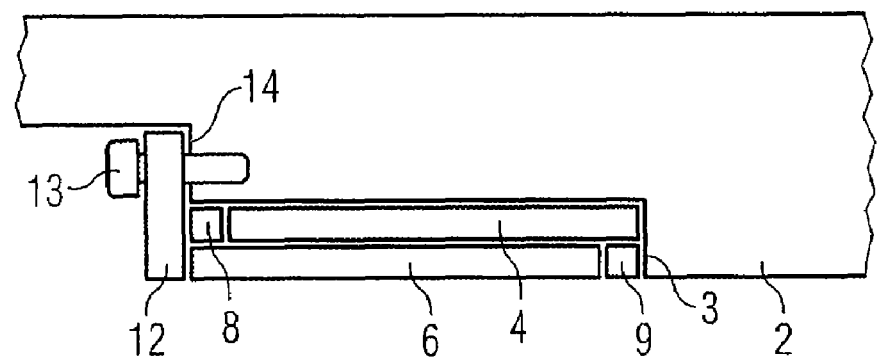

A second embodiment shown in FIG. 3b also provides for the rotor shaft 2 to be realized as a hollow shaft. The said shaft has a first step 3 and an additional second step 14. The unit shown in FIG. 2c, which consists of the plastic cage 5, the permanent magnets 6 and the return ring 4, is pushed onto this rotor shaft 2 in such a way that the first step 3 serves as an axial stopping surface for the said unit. It can be seen that the ring 9 and an axial stopping surface of the return ring 4 rest directly against the step 3. The ring 8 and a stopping surface of the permanent magnets 6 lie flush with the said second step 14 and rest against a mounting plate 12 that is pushed onto the rotor shaft 2. Screws 13 that pass through the mounting plate 12 attach it to the rotor shaft 2.

The permanent magnet rotor created by this means is likewise quick and easy to produce and runs quietly and reliably when in operation. If this permanent magnet rotor is arranged rotatably in a stator in a brushless electrical machine with just a small separation from the said stator, the machine will operate with a high level of efficiency.

What is claimed is:

1. A permanent magnet rotor for a brushless electrical machine, comprising
   a rotor shaft and
   a cylindrical plastic cage in which permanent magnets are inserted, wherein
   the plastic cage has dovetailed retainers and
   the permanent magnets are trapezoidal in shape and are inserted so as to fit tightly in the dovetailed retainers, wherein the plastic cage has a web between each pair of adjacent permanent magnets and the permanent magnets are clamped with no play by the webs and a return ring.

2. A permanent magnet rotor according to claim 1, wherein the height dimension of the webs is slightly larger than the height dimension of the permanent magnets.

3. A permanent magnet rotor according to claim 1, wherein the width dimension of the webs in the region of the inner end area, as viewed in the radial direction, of the permanent magnets is smaller than the width dimension of the webs in the region of the outer end area, as viewed in the radial direction, of the permanent magnets.

4. A permanent magnet rotor according to claim 1, wherein the exterior faces of the webs and the exterior faces of the permanent magnets meet flush with one another.

5. A permanent magnet rotor according to claim 1, wherein the permanent magnets have a rectangular exterior face.

6. A permanent magnet rotor according to claim 1, wherein the exterior faces of the webs and the exterior faces of the permanent magnets form a continuous exterior face of the permanent magnet rotor.

7. A permanent magnet rotor according to claim 1, wherein the plastic cage has two rings, spaced apart from each other in the axial direction, that are joined together by the webs and the inner diameter of the first ring is smaller than the inner diameter of the second ring.

8. A permanent magnet rotor according to claim 7, wherein the first ring serves as a stopping surface for the return ring.

9. A permanent magnet rotor according to claim 7, wherein the second ring serves as a stopping surface for the permanent magnets.

10. A permanent magnet rotor according to claim 1, wherein the rotor shaft is provided with a step and this step serves as a stopping surface for an axial end region of the plastic cage with magnets and an return ring inserted.

11. A permanent magnet rotor according to claim 10, wherein the other end region of the plastic cage with magnets and return ring inserted is fixed to the rotor shaft using a coupling nut.

12. A permanent magnet rotor according to claim 10, wherein the rotor shaft is provided with a second step, the other end region of the plastic cage with magnets and return ring inserted rests against a mounting plate and the mounting plate is attached to the rotor shaft using fastening screws.

13. A permanent magnet rotor for a brushless electrical machine, comprising
    a rotor shaft and
    a cylindrical plastic cage in which permanent magnets are inserted, wherein
    the plastic cage has dovetailed retainers,
    the permanent magnets are trapezoidal in shape and are inserted so as to fit tightly in the dovetailed retainers,
    the plastic cage has a web between each pair of adjacent permanent magnets and the permanent magnets are clamped with no play by the webs and a return ring, and
    the height dimension of the webs is slightly larger than the height dimension of the permanent magnets.

14. A permanent magnet rotor according to claim 13, wherein the width dimension of the webs in the region of the inner end area, as viewed in the radial direction, of the permanent magnets is smaller than the width dimension of the webs in the region of the outer end area, as viewed in the radial direction, of the permanent magnets.

15. A permanent magnet rotor according to claim 13, wherein the exterior faces of the webs and the exterior faces of the permanent magnets meet flush with one another.

16. A permanent magnet rotor according to claim 13, wherein the permanent magnets have a rectangular exterior face.

17. A permanent magnet rotor according to claim 13, wherein the exterior faces of the webs and the exterior faces of the permanent magnets form a continuous exterior face of the permanent magnet rotor.

18. A permanent magnet rotor according to claim 13, wherein the plastic cage has two rings, spaced apart from each other in the axial direction, that are joined together by the webs and the inner diameter of the first ring is smaller than the inner diameter of the second ring.

19. A permanent magnet rotor according to claim 18, wherein the first ring serves as a stopping surface for the return ring or for the permanent magnets.

* * * * *